United States Patent [19]

Washabaugh et al.

[11] 4,314,919

[45] Feb. 9, 1982

[54] METHOD OF THICKENING LIQUID POLYESTER SYSTEM WITH CLAY

[75] Inventors: Frank J. Washabaugh, Titusville; William C. Goble, Old Bridge, both of N.J.

[73] Assignee: Engelhard Minerals & Chemicals Corporation, Edison, N.J.

[21] Appl. No.: 129,521

[22] Filed: Mar. 12, 1980

[51] Int. Cl.$^3$ ............................................. C08L 91/00
[52] U.S. Cl. .............................. 260/22 CB; 260/40 R
[58] Field of Search ......................... 260/22 CB, 40 R

[56] References Cited

U.S. PATENT DOCUMENTS

| | | | |
|---|---|---|---|
| 2,909,740 | 10/1959 | Seidel et al. | 260/40 R |
| 2,969,337 | 1/1961 | Goodwin et al. | 260/40 R |
| 3,014,001 | 12/1961 | Murray | 260/40 R |
| 3,328,231 | 6/1967 | Sergovic | 260/40 R |
| 3,974,125 | 8/1976 | Oswald et al. | 260/40 R |
| 4,081,496 | 3/1978 | Finlayson | 260/40 R |
| 4,216,135 | 8/1980 | Finlayson | 260/40 R |

*Primary Examiner*—Lewis T. Jacobs
*Attorney, Agent, or Firm*—Inez L. Moselle

[57] ABSTRACT

Liquid unsaturated polyester resins may be thickened and made thixotropic by addition of a colloidal, gelling grade clay such as attapulgite and a quaternary ammonium surfactant under moderate shear. This thixotropic polyester composition is formed without making provision for first chemically reacting clay and surfactant. For enhanced long-term stability a tertiary amine surfactant having an alkyl group and two polyoxyethylene groups attached to the nitrogen may be added to the above composition. For polyester resins having a styrene monomer content greater than 35%, the clay and surfactant are mixed with styrene first, to form a pregel, prior to addition of the polyester resin to be thickened.

10 Claims, No Drawings

METHOD OF THICKENING LIQUID POLYESTER SYSTEM WITH CLAY

BACKGROUND OF THE INVENTION

1. Field of the Invention

This invention relates to a novel process for imparting thixotropy to unsaturated polyester liquid resins. More specifically a gelling grade clay and a surfactant are mixed into the polyester resin to form a thixotropic composition, the surfactant being intimately mixed into the clay by blending, without making provision for chemically reacting clay and surfactant.

2. Description of the Prior Art

Typical unsaturated liquid polyesters are polyesters of a dicarboxylic acid, e.g. maleic, phthalic or their anhydrides, and a diol, e.g. ethylene glycol, propylene glycol. These polyesters are made by conventional techniques of esterification well known in the art. Other polyesters may be made by varying the components or the manufacturing process. Commerical polyester systems commonly contain, in widely varying amounts, an unsaturated aromatic monomer having one or more ethylenically unsaturated radicals in addition to the polyester. This monomer is useful as a cross-linking agent and as a diluent to reduce viscosity. Styrene is the most effective and widely used aromatic monomer of this type.

In the application of liquid polyester resins thixotropy is a desirable characteristic. It prevents running or sagging after the material is applied. In highly filled systems such as automotive body patch thixotropy prevents separation of the solid filler particles from the liquid resin by gelling the system into a semi-solid state. This prevents the particles from floating or sinking under the action of buoyant and gravitational forces. A thixotropic system is one that forms a solid-like gel upon standing, but becomes liquid under mechanical agitation and flows easily under shear. The thixotropic system is reversible, i.e. once the liquid has flowed and shear is removed, a gel structure immediately begins to reform in the system. Viscosity begins to increase until the solid-like gel is formed, and the material will not flow under the action of gravity.

Pyrogenic or fumed silica supplied as a fine, fluffy powder is often used commercially to impart thixotropy to liquid polyester resins. Silica is expensive compared to thickening agents comprising gelling grade clays. It also has further drawbacks of settling and loss of sag control on short term aging. Clays may be adapted for use in polyester systems, but they are often required in larger amounts than the silica. When clay is added in excessive amounts, the resin loses its transparency. It may also become tinted. In addition clays may require more energy for mixing than the silicas. If the clay is surfactant modified, the surfactant must be one that will not interfere with the activators and catalysts that are used to cure the resins.

Gelling grade clays such as the expanding or swelling montmorillonites, including bentonite and hectorite, and the needle-like attapulgite, also known as Georgia-Florida fuller's earth, may be adapted to polyester resin systems by modifying the surface to make it more organophilic. This modification may be carried out by (a) chemically reacting an appropriate surfactant, either cationic or nonionic, with the clay to form so-called "onium-clays", "organo-clays" or clay-surfactant reaction products, or (b) physically sorbing or coating an appropriate surfactant on the clay particles by mixing or blending them together. In the case of the blended product the third component, generally the liquid to be thickened, may be added to the clay first or to the surfactant first, the other component being blended in thereafter. In either case moderately high shear mixing is usually required for complete dispersion. If mixing is carried out for too long a time or at shear rates too high, no gelling will take place. If mixing is carried out for too short a time or at shear rates too low, incomplete mixing and poor gelling will result. One formulation of clay and surfactant will in general not be adequate to thicken a system other than the one it was adapted for. On the other hand several different formulations of clay and surfactant may be adequate to thicken a given system.

In thickening polyester resins U.S. Pat. No. 3,795,650 to Burns discloses the use of a polyol and a gelling grade clay (attapulgite, montmorillonite, or sepiolite) worked into a pregel formulation with the resin, whereupon the pregel is then used to impart thixotropy to so-called hand layup moldings. U.S. Pat. No. 3,974,125 to Oswald et al discloses a surfactant-clay reaction product, where the surfactant, a dimethyl-di (hydrogenated tallow) ammonium chloride, is bonded to a montmorillonite clay by chemical reaction. The organo-clay is used to produce a thixotropic polyester pregel (with styrene) which is then used to thicken a wide variety of polyester systems. U.S. Pat. No. 4,081,496 to Finlayson discloses another surfactant-caly reaction product in a pregel formulation. Smecite-type clays such as bentonite and hectorite are reacted with certain types of quaternary ammonium compounds such as a methyl benzyl dialkly ammonium chloride in specific proportions to produce the organo-clay. This clay gellant is mixed with an unsaturated aromatic monomer, such as styrene, under high shear to form a soft pregel.

Modifying clay with a surfactant for the purpose of gelling a liquid system is well known in the prior art. For example, U.S. Pat. No. 2,797,196 to Dunn et al shows a modified clay for use in oil-base drilling fluids consisting essentially of anhydrous clay wetted with a non-anionic surfactant such as a quaternary ammonium salt, and an oily pugging agent. In the grease art, U.S. Pat. No. 2,819,210 to Haden et al discloses a two-surfactant system formed by a tertiary amine having an alkyl group of twelve to eighteen carbon atoms and two polyoxyethylene groups attached to the nitrogen and an alkylammonium salt of a monoalkyl alkylamidophosphate. These surfactants are mixed with an attapulgite clay of 5–30% moisture content and a hydrocarbon oil to form a bodied lubricant or grease. U.S. Pat. No. 2,885,360 to Haden et al discloses a similar composition for bodying a wide variety of organic liquids. A tallow fatty dialkyl dimethyl quaternary ammonium chloride was used in a process in which water was vaporized from the clay during dispersion of the constituents in the organic liquid. Ferrigno U.S. Pat. No. 2,975,071 discloses a method for making gelled thixotropic paints by mixing into an alkyd vehicle a polyisocyanate and a colloidal clay. Miericke U.S. Pat. No. 3,027,265 discloses as onium clay reaction product formed by metathesis (a chemical reaction involving the exchange of ions; reference is made to Hauser U.S. Pat. No. 2,531,427) for use in molding sands. The organophilic clay is mixed with an organic liquid lubricant to form a thixotropic binder for the sand. Sawyer U.S. Pat. No.

4,147,519 discloses a method for thickening suspension of coal dust in organic liquids by adding a gelling grade clay and an organic cationic or nonionic surfactant.

An object of the present invention is to formulate a thixotropic polyester composition in which clay and surfactant will be an economic replacement for pyrogenic silica as a thixotrope for polyester resin systems, especially those in which haze or color tint are not important. Another object of the invention is to formulate a thixotropic polyester composition containing clay that will retard separation of filler and liquid resin in filled polyester systems. Still another object of the invention is to formulate a thixotropic polyester composition containing clay to prevent sags and runs in liquid polyester resins after being applied. An additional object of the invention is to formulate without pregel a thixotropic polyester composition containing clay that will be effective in thickening high viscosity or highly filled polyester resins.

SUMMARY OF THE INVENTION

In the present invention polyester resins may be thickened effectively and economically by adding thereto and mixing directly therewith a gelling grade clay and suitable surfactants, singly or in combination, in amounts and under shear rates sufficient to achieve the desired thixotropic properties. Surprisingly, polyester resins containing less than 35% styrene monomer may be thickened effectively without pregel. Well-known gelling grade clays such as colloidal attapulgite may be used in practice of the invention in combination with one or more species of quaternary ammonium surfactants. The surfactant may be blended with the clay by conventional mixing, so that it is completely taken up into the clay without making provision for chemically reacting the two by metathesis reaction, as is done in the prior art synthesis of "onium" or organo-clays. Clay treated according to the present invention is then blended into the resin to form the thixotropic polyester composition. Alternatively, the surfactant may be added to the polyester first and the clay blended in thereafter.

For enhanced long-term stability in thixotropic polyester compositions made according to the present invention, another surfactant comprising a tertiary amine having an alkyl group of 12 to 18 carbon atoms and two polyoxyethylene groups attached to the nitrogen may be added. The two surfactants give a synergistic effect in which neither surfactant acting alone produces the same level of viscosity stability and thixotropy as both do acting together.

Significant advantages of the above-mentioned thixotropic polyester compositions over others containing fumed silica instead of treated clay include increased effectiveness and lower cost. Special ventilation requirements are necessary when using fumed silicas because of the health hazard (silicosis) if the silica is inhaled. Such precautions may not be required for the clay-surfactant composition.

For liquid polyester resins having a styrene or other ethylenically unsaturated monomer content greater than 35%, the monomer must be included in a pregel composition of clay and surfactant to which the resin may be subsequently added. Apparently these concentrations of styrene monomer in the polyester resin inhibit the establishment of a gel structure unless the clay is added as a pregel in which the gel structure is already substantially formed. The compositions of the present invention may all be made by simple mixing or blending.

DESCRIPTION OF THE PREFERRED EMBODIMENTS

Three liquid polyester systems of commercial importance, gel coat, body patch and laminating resin are prime candidates for these effective, low-cost, clay-based thixotropes. Polyester gel coat is a relatively high viscosity, unfilled system. The body patch is a highly filled gel coat, which may contain up to 60% by weight talc filler. In lightweight body patch, hollow glass spheres 75 microns in diameter, called by the trade name Microballons ®, are substituted for part of the talc. When the filled systems are allowed to stand for periods of time, the system tends to separate with the talc settling to the bottom and the microballons rising to the top. Remixing is often difficult and incomplete. Addition of a thixotrope stabilizes the filled system and largely prevents separation. The laminating resin is an unfilled, low viscosity, high styrene (greater than 35%) system. Styrene is added to lower the viscosity so that the system may be easily sprayed onto fiberglass mats or other receiving surfaces.

Cationic quaternary ammonium surfactants give significant thixotropy when mixed with a gelling grade clay and subsequently added to a liquid polyester resin. The quaternary ammonium salts can be represented by the formula:

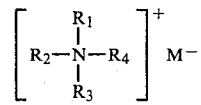

wherein R is any organic group and M is an anion, most preferably chloride or methyl sulfate. In the preferred quaternary ammonium surfactants $R_1$ and $R_3$ are methyl groups and $R_2$ and $R_4$ are long chain alkyl radicals having 12 to 22 carbon atoms, most preferably 12 or 18. Dimethyl-di (coco) ammonium chloride having a carbon chain length distribution as follows: 5% $C_8$, 6% $C_{10}$, 51% $C_{12}$, 19% $C_{14}$, 9% $C_{16}$, and 10% $C_{18}$ is the preferred surfactant. This is manufactured by Armak, Industrial Chemicals Division and sold under the trade name Arquad ® 2C-75. However, di-methyl di-hydrogenated tallow ammonium chloride surfactant, such as Arquad ® 2HT-75 surfactant, having a carbon chain length distribution 3% $C_{14}$, 29% $C_{16}$ and 68% $C_{18}$ may also be used for adequate thickening. An imidazolinium methyl sulfate surfactant based on quaternary ammonium has also been found to give superior thickening in combination with the clay. This compound, methyl-1-oleyl amido ethyl-2-oleyl imidazolinium methyl sulfate, is manufactured by Sherex Chemical Corporation and sold under the trade name Varisoft ® 3690. The compound is represented below:

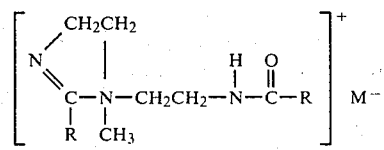

wherein R is a long chain alkyl group (oleyl), and M is the methyl sulfate anion. This has a form similar to a quaternary ammonium compound in which adjacent substituents on the nitrogen, $R_1$ and $R_4$ for instance, are chemically linked. Clay and surfactant may be blended together in ratios of 3 to 15 parts clay to one part surfactant by weight. Blending below a ratio of 3/1 is generally not economical; blending above 15/1 does not give uniformly wetted clay, i.e. part of the clay will still be dry or unwetted by the surfactant. The preferred ratio is between 8/1 and 12/1 clay to surfactant. The optimum proportions are a matter of economics and product requirements.

For enhanced stability of filled polyester resins upon long-term standing a second, tertiary amine, surfactant may be added. The tertiary amines having a single alkyl group and two polyoxyethylene groups may be represented by the following formula:

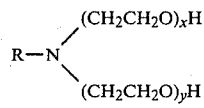

wherein R is the alkyl group having preferably between 12 and 90 carbon atoms, and x and y are integers totalling between 2 and 50. A tertiary amine having a coco fatty acid group and two polyoxyethylene groups attached to the nitrogen is preferred, because stability is enhanced over that obtainable by using either surfactant alone. Such a surfactant is sold under the name Ethomeen ® C-12, which has a total of two, single-unit oxyethylene groups attached to the nitrogen. This surfactant may be added in any proportion with the quaternary ammonium surfactant, but about a 1:2 ratio by weight, or 33% of the weight of total surfactant is preferred.

In formulating a thixotropic composition with polyester of less than 35% by weight of styrene monomer, blending the surfactant and clay first, before adding it to the resin to be thickened is preferred. The preferred colloidal, gelling grade clay is attapulgite. The clay, after being blended with surfactant is still dry and powdery and easy to handle. When the styrene content of the polyester resin to be thickened is greater than 35%, clay and surfactant must be blended with styrene in amounts sufficient to form a pregel. It is preferred to add the surfactant to the styrene first before blending in the clay to form the pregel. The resin is then blended into the pregel, rather than the reverse. This procedure was found to give superior thickening with polyester systems containing over 35% by weight styrene monomer.

In order to more fully illustrate this invention and its manner of practice, the following examples, which are not to be construed as limiting, are presented:

EXAMPLE I

A finely milled high volatile matter collidal attapulgite clay supplied under the trade name ATTAGEL ® 50 and Arquad 2C-75 surfactant were mixed together in a 10:1 clay-to-surfactant ratio. The particular sample of ATTAGEL 50 clay had a free moisture of 12.9%, a volatile matter content on a moisture-free basis of 8.6% and a base exchange capacity of 20 milliequivalents per 100 g. clay. Arquad 2C-75 surfactant is a 75% active, cationic surfactant comprising a dimethyl-di (coco) ammonium chloride surfactant dispersed in a water/isopropanol mixture. This liquid surfactant (100 g.) was added directly to 1,000 grams of ATTAGEL 50 clay in and 8-quart capacity P-K Twin-Shell ® Blender with intensifier bar made by Patterson-Kelley. The surfactant was introduced by gravity feed through the intensifier bar feed tube which resulted in a dispersion of very small droplets being spread over the slowly tumbling clay bed. The liquid was completely dispersed in the clay within about three minutes. The intensifier bar was run for 12 additional minutes and then turned off. The blender rotated for an additional 15 minutes. The temperature of the clay-surfactant mixture was monitored and found to be no higher than 80° F. throughout the mix cycle. To determine the uniformity of surfactant dispersed in the clay, four one-gram samples of the batch were taken at random. Leco carbon analysis, familiar to those skilled in the art, was used to determine the surfactant content. The results are shown below:

TABLE I
TEST FOR UNIFORM MIXING OF CLAY AND SURFACTANT

| Sample | % C Measured by Leco Method | % Carbon Due to Surfactant Addition | % Arquad 2C-75 Surfactant in Clay-Surfactant Mixture |
|---|---|---|---|
| Untreated ATTAGEL 50 | 0.52 | — | — |
| Treated Sample #1 | 6.23 | 5.71 | 9.92 |
| Treated Sample #2 | 5.98 | 5.46 | 9.10 |
| Treated Sample #3 | 5.95 | 5.43 | 9.05 |
| Treated Sample #4 | 5.81 | 5.29 | 8.81 |

The degree of uniformity of mixing shown in Table I by the range of surfactant content of 8.81 to 9.92% about an average of 9.09% is expected to be acceptable for the intended thickening of polyester resin.

EXAMPLE II

The treated attapulgite thixotrope made according to the aforementioned example was used to thicken a talc-filled polyester resin system. Polylite ® 32-367 polyester resin, a flexible, low viscosity resin available from Reichhold Chemical Corporation, doubly promoted with dimethyl aniline and cobalt octoate for room temperature use was used as the resin. Emtal ® 42 talc, a platy talc of particle size 50% finer than 14 microns available from Engelhard Minerals and Chemicals Corporation, was used as the filler. A Sears drill press with a flat paddle blade driven at 500 r.p.m. was used to agitate 421 grams of the resin in a quart-size steel can, to which 328 grams of the talc were slowly added. Following the addition of talc, 40 grams of hollow glass microspheres, 3 M grade C15/250, were added. The resulting mixture was agitated at 500 r.p.m. for five minutes and 1,000 r.p.m. for an additional five minutes. At this time 7.0 grams of the treated attapulgite thixotrope prepared as in Example I were added under agitation. The complete mixture was agitated at 1,000 r.p.m. for another five minutes. This mixture compared favorably with a silica-filled mixture made with 1% Cab-O-Sil ® M-5 fumed silica (based on weight of the polyester resin) in place of the treated attapulgite thickener as shown in Table II below:

TABLE II

BROOKFIELD* VISCOSITIES OF THICKENED AND UNTHICKENED POLYESTER BODY PATCH RESINS

| | Viscosity, cps. | | |
|---|---|---|---|
| Spindle Speed r.p.m. | Unthickened Resin | Resin with 1.0% Cab-O-Sil M-5 fumed silica | Resin with 1.7% treated attapulgite |
| 0.5 | 258,000 | 282,000 | 280,000 |
| 5 | 70,000 | 103,000 | 96,000 |
| 50 | 30,080 | 40,000 | 39,600 |

*Brookfield Model RVT

All Brookfield viscosities reported hereinafter were obtained with a Brookfield Model RVT instrument. The data show virtually identical thickening between the 1.0% Cab-O-Sil silica sample and the 1.7% treated attapulgite sample.

To test for glass bubble float-out and resin-talc separation, samples were subjected to room temperature (80° F.) and elevated temperature (120° F.) vibration tests. Quart-size steel paint cans containing about 800 grams of body filler and covered with aluminum foil were mounted on an 11½-inch × 22-inch horizontal wooden platform capable of being shaken at low amplitudes by a Syntron Model V-20 Magnetic Vibrator. This unit was mounted in a forced air convection oven for the elevated temperature tests. In the room temperature vibration test the unthickened resin showed microspheres after 11 hours. At elevated temperature the attapulgite thickened sample showed some microspheres after 2½ hours; after 5 hours both thickened samples showed microspheres.

EXAMPLE III

In another formulation of body patch thickened with Cab-O-Sil M-5 fumed silica in one instance and with treated attapulgite made according to Example I in another, samples were tested for viscosity and float-out after standing at room temperature for periods of time. The Cab-O-Sil silica formulation showed separation after 14 days; the attapulgite thickened sample did not show separation until 44 days. Brookfield viscosities were measured periodically with the results shown in Table III below:

TABLE III

BROOKFIELD VISCOSITIES OF THICKENED BODY PATCH RESINS

| | Viscosity cps. | | | |
|---|---|---|---|---|
| | Silica Thickened | | Clay Thickened | |
| | Polylite® 31-001 Resin | 50.8% | Polylite® 31-001 Resin | 50.5% |
| | Emtal 42 talc | 45.7 | Emtal 42 talc | 45.3 |
| | 3m Microballoons | 3.0 | 3m Microballoons | 3.0 |
| | Cab-O-Sil M-5 fumed silica | 0.5 | treated attapulgite* | 1.2 |
| Time | 0.5 r.p.m. | 100 r.p.m. | 0.5 r.p.m. | 100 r.p.m. |
| Initial | 720,000 | 24,000 | 480,000 | 21,560 |
| 14 days | 602,000 | 26,200 | 502,000 | 25,200 |
| 30 days | 618,000 | 23,400 | 462,000 | 26,800 |
| 44 days | 658,000 | 26,400 | 588,000 | 27,400 |
| 58 days | 652,000 | 31,040 | 540,000 | 29,000 |

*Prepared according to Example I.

This shows that treated attapulgite gives results equivalent to Cab-O-Sil silica when used in quantities double or triple that of the silica.

EXAMPLE IV

Thickening of gel coat resins is often accomplished with 3% addition of a fumed silica such as Cab-O-Sil M-5 silica. Reichhold Polylite ® 31-001 polyester resin is a rigid, unpromoted, orthophthalic type resin used for gel coats, castings, and as the base resin for molding of cloth, mat and preforms. It has low reactivity, medium viscosity and is normally catalyzed with 0.5 to 1.0% benzoyl peroxide granules. The recommended method of incorporating silica into the resin is by high shear mixing with a Cowles-type blade. Accordingly, 10.5 grams of Cab-O-Sil M-5 silica were slowly added to 350 grams of Polylite 31-001 resin under agitation at 1500 r.p.m. using a Cowles blade. After the addition was completed, the speed was increased to 3500 r.p.m. for two minutes to complete the dispersion. Brookfield viscosities were measured every week for seven weeks with the following results:

TABLE IV

BROOKFIELD VISCOSITIES OF POLYESTER GEL COAT RESIN THICKENED WITH 3% CAB-O-SIL M-5 SILICA

| | Brookfield Viscosity, cps. | |
|---|---|---|
| Time | 0.5 r.p.m. | 50 r.p.m. |
| Initial | 56,800 | 6,590 |
| 7 days | 62,400 | 8,100 |
| 14 days | 42,000 | 8,300 |
| 28 days | 24,400 | 8,700 |
| 42 days | 32,000 | 10,420 |
| 56 days | 26,320 | 10,620 |

These results show good initial thickening, lower, but reasonably steady low-term thickening. The expected non-newtonian, shear thinning behavior is also evident from viscosity dependence on spindle speed (r.p.m.).

EXAMPLE V

ATTAGEL 50 clay treated as in Example I with Arquad 2C-75 surfactant was added to Polylite 31-001 polyester gel coat resin according to the method of Example II. The clay-to-surfactant ratio was 5/1. The viscosity stability with time is shown in Table V, below:

TABLE V

BROOKFIELD VISCOSITIES OF POLYESTER GEL COAT RESIN THICKENED WITH QUATERNARY-TREATED ATTAPULGITE

| | Brookfield Viscosity, cps. | |
|---|---|---|
| Time | 0.5 r.p.m. | 50 r.p.m. |
| Initial | 182,400 | 9,200 |
| 12 days | 141,800 | 8,800 |
| 33 days | 132,800 | 10,700 |
| 49 days | 128,000 | 11,660 |

Treated attapulgite was present at a level of 12% based on the weight of the polyester. At 6% addition viscosities comparable to the Cab-O-Sil silica thickened sample of Table IV may be obtained. The amount of thickening achieved depends directly upon the amount of attapulgite and surfactant added. In general, for the same degree of thickening the amount of attapulgite-based thixotrope required is double that of Cab-O-Sil M-5 silica.

EXAMPLE VI

Not all surfactants in combination with attapulgite will give adequate thickening. ATTAGEL 50 clay treated as in Example I with Ethomeen C-12 surfactant was added to Polylite 31-001 polyester gel coat resin according to the method of Example II. The clay-to-surfactant ratio was 5/1. Viscosity stability with time is illustrated in Table VI, below:

TABLE VI

BROOKFIELD VISCOSITIES OF POLYESTER GEL COAT RESIN THICKENED WITH TERTIARY AMINE-TREATED ATTAPULGITE

| Time | Brookfield Viscosity, cps. | |
|---|---|---|
| | 0.5 r.p.m. | 50 r.p.m. |
| Initial | 32,000 | 5,840 |
| 7 days | 44,000 | 9,220 |
| 14 days | 48,000 | 10,500 |
| 21 days | 52,000 | 9,780 |
| 35 days | 56,200 | 10,280 |
| 49 days | 62,200 | 10,900 |

Treated attapulgite was present at a level of 12% based on the weight of the polyester. Even at this level thickening was not quite as good as with the Cab-O-Sil silica of Example IV. However, the trend of increased viscosity with time is unusual.

EXAMPLE VII

ATTAGEL 50 clay pretreated with a two-surfactant system comprising both surfactants of Examples V and VI offered the surprising result of greater viscosity stability in polyester systems than Cab-O-Sil M-5 silica or either single-surfactant, clay-based thixotrope. Following the procedure of Example I, ATTAGEL 50 clay was sequentially pretreated with Arquad 2C-75 surfactant at 7:1 clay-to-surfactant ratio and Ethomeen C-12 surfactant at a 12:1 clay-to-surfactant ratio, thereby bringing the clay-to-total surfactant ratio to about 4.4:1, comparable to the previous two examples. Addition of 51.5 grams of attapulgite so treated to 340 grams of Polylite 31-001 polyester resin with paddle blade agitation at 1500 r.p.m. as in Example II gave the following results:

TABLE VII

BROOKFIELD VISCOSITIES OF POLYESTER GEL COAT RESIN THICKENED WITH ATTAPULGITE TREATED BY TWO-SURFACTANT SYSTEM

| Time | Brookfield Viscosity, cps. | |
|---|---|---|
| | 0.5 r.p.m. | 50 r.p.m. |
| Initial | 152,800 | 9,600 |
| 7 days | 184,000 | 12,580 |
| 14 days | 203,200 | 13,700 |
| 21 days | 204,000 | 12,820 |
| 35 days | 212,800 | 14,020 |
| 49 days | 226,400 | 14,700 |

These results show excellent low shear thickening, very good high shear thickening (superior to the Cab-O-Sil silica of Example IV) and excellent viscosity stability shown by the absence of large decreases in viscosity with time.

Treated attapulgite was present at a level of 12% based on the weight of the polyester, the same level as in the previous two examples. At 6% addition viscosities comparable to the Cab-O-Sil silica of Table IV may be obtained with the added benefit of improved long-term viscosity stability.

EXAMPLE VIII

Low viscosity polyester laminating resins, formed by diluting a gel coat resin such as Reichhold Polylite 31-001 resin with styrene to 40% styrene by weight, are often thickened with pyrogenic silica at a level of 0.5-1.5%. Such addition was carried out according to the method of Example III with the following results:

TABLE VIII

BROOKFIELD VISCOSITIES OF SILICA-THICKENED AND UNTHICKENED LAMINATING RESIN

| | Viscosity, cps. | | |
|---|---|---|---|
| Spindle Speed | 31-001 Resin | 40% Styrene | Cab-O-Sil M-5 |
| 5 r.p.m. | 1520 | 350 | 860 |
| 50 r.p.m. | 1520 | 350 | 600 |

The results show acceptable thickening of the resin. The resins were essentially Newtonian in diluted and undiluted states, as the viscosity showed no dependence on spindle speed. The thickened resin showed the expected non-Newtonian, shear-thinning behavior.

EXAMPLE IX

Low viscosity polyester laminating resins must be thickened with a pregel when using clay-based thixotropes, owing probably to the high concentration of styrene-type monomer in the polyester. Using a paddle blade mixer at 300 r.p.m., 6.7 grams of the treated attapulgite made according to Example I were added to 34.7 grams of liquid styrene monomer. The mixture was agitated for two minutes until it appeared homogeneous. It was allowed to rest while changing the mixing blade to a high shear, Cowles-type blade. Then 300 grams of Polylite 31-001 resin were slowly added while the mixture was being agitated at 750 r.p.m. When all of the polyester had been added, the speed was increased to 1500 r.p.m. for an additional five minutes. Using this technique, viscosities equivalent to the 1.0% silica-thickened system of Example VIII were obtained.

EXAMPLE X

A styrene pregel was formed by adding the surfactant to the styrene first and then blending in the clay. Varisoft 3690, surfactant, a methyl-1-oleyl amido ethyl-2-oleyl imidazolinium methyl sulfate, was used. Polylite 31-001 laminating resin was subsequently blended into the pregel to form a thixotropic system. This method of addition gave results superior to adding surfactant-treated clay to styrene to form the pregel.

The pregel was prepared by mixing 34.7 grams of styrene and 1.05 grams of Varisoft 3690 surfactant for two minutes using a flat paddle blade at 300 r.p.m. Then 8.4 grams of untreated ATTAGEL 50 clay were added over a two minute period, the mixing being continued at 300 r.p.m. to form the pregel. Polylite 31-001 resin (300 g.) was then added over a five minute period. The resulting mix was agitated at 500 r.p.m. for an additional five minutes. The thickened polyester was found to have viscosity characteristics comparable to that obtained with systems containing 1.5% Cab-O-Sil M-5 silica as the thickening agent. The results are shown below in Tables IX and X.

TABLE IX

BROOKFIELD VISCOSITIES FOR POLYESTER LAMINATING RESIN THICKENED WITH 3% IMIDAZOLINIUM SURFACTANT AND ATTAPULGITE CLAY THIXOTROPE

| Time | Viscosity, cps. | |
|---|---|---|
| | 5 r.p.m. | 50 r.p.m. |
| Initial | 800 | 479 |
| 8 days | 800 | 676 |

TABLE IX-continued
BROOKFIELD VISCOSITIES FOR
POLYESTER LAMINATING RESIN
THICKENED WITH 3% IMIDAZOLINIUM
SURFACTANT AND ATTAPULGITE CLAY THIXOTROPE

| Time | Viscosity, cps. | |
|---|---|---|
| | 5 r.p.m. | 50 r.p.m. |
| 12 days | 600 | 541 |
| 19 days | 608 | 509 |
| 30 days | 728 | 591 |

TABLE X
BROOKFIELD VISCOSITIES FOR
POLYESTER LAMINATING RESIN
THICKENED WITH 1.5% CAB-O-SIL M-5 SILICA

| Time | Viscosity, cps. | |
|---|---|---|
| | 5 r.p.m. | 50 r.p.m. |
| Initial | 928 | 657 |
| 8 days | 1040 | 938 |
| 13 days | 968 | 761 |
| 20 days | 1232 | 727 |
| 31 days | 1288 | 830 |

We claim:

1. A process for preparing a thixotropic unsaturated liquid polyester composition from an unsaturated liquid polyester resin system comprising a polyester and an ethylenically unsaturated monomer, wherein said monomer is present in amount less than 35% based on the weight of said polyester, by adding to said polyester resin system a cationic quaternary ammonium surfactant and then mixing directly therewith a colloidal gelling grade clay in amounts and at shear rates sufficient to form said thixotropic composition.

2. A process for preparing a thixotropic unsaturated liquid polyester composition from an unsaturated liquid polyester resin system comprising a polyester aned an ethylenically unsaturated monomer, wherein said monomer is present in amount greater than 35% based on the weight of said polyester, by mixing together said ethylenically unsaturated monomer and a quaternary ammonium surfactant, and then adding thereto a colloidal gelling grade clay to form a pregel, and adding to said pregel said polyester resin system in amounts and under the shear sufficient to form said thixotropic composition.

3. The process of claim 1 or 2 wherein said ethylenically unsaturated monomer is styrene.

4. The process of claim 1 or 2 wherein the clay is selected from the group consisting of attapulgite, bentonite and sepiolite.

5. The process of claim 1 or 2 wherein said quaternary ammonium surfactant is selected from the group consisting of di-methyl di-coco ammonium chloride, di-methyl di-hydrogenated tallow ammonium chloride, methyl-1-oleyl amido ethyl-2-oleyl imidazolinium methyl sulfate and mixtures thereof.

6. The process of claim 1 or 2 wherein said composition additionally contains a tertiary amine surfactant having a nitrogen atom with an alkyl group containing from 12 to 18 carbon atoms and two polyoxyethylene groups attached to the nitrogen, wherein said tertiary amine surfactant is added with said quaternary ammonium surfactant in the ratio of about ½.

7. The process of claim 6 wherein said alkyl group is a coco fatty acid group containing 12 carbon atoms, and a total of two oxyethylene groups are attached to the nitrogen.

8. The process of claim 1 or 2 wherein the total amount of surfactant present in the composition ranges up to 33% of the weight of the clay.

9. The process of claim 1 or 2 wherein the clay and total surfactant content taken together are at least 1% of the weight of the polyester resin.

10. The process of claim 1 or 2 wherein said clay is added to said polyester resin or styrene and then said surfactant is added thereto.

* * * * *

UNITED STATES PATENT AND TRADEMARK OFFICE
CERTIFICATE OF CORRECTION

PATENT NO. : 4,314,919

DATED : February 9, 1982

INVENTOR(S) : Frank J. Washabaugh et al

It is certified that error appears in the above-identified patent and that said Letters Patent are hereby corrected as shown below:

Column 5 - line 26 should read -- 12 and 20 carbon atoms, and x and y are integers total- --

Column 6 - line 3 should read -- an 8-quart capacity P-K Twin-Shell® Blender with --

*Signed and Sealed this*

*Twenty-fifth* Day of May 1982

[SEAL]

*Attest:*

*Attesting Officer*

GERALD J. MOSSINGHOFF

*Commissioner of Patents and Trademarks*